(12) United States Patent
Fazzini

(10) Patent No.: US 7,821,673 B2
(45) Date of Patent: Oct. 26, 2010

(54) METHOD AND APPARATUS FOR REMOVING VISIBLE ARTEFACTS IN VIDEO IMAGES

(75) Inventor: Paolo Giuseppe Fazzini, Watford (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 1086 days.

(21) Appl. No.: 11/222,509

(22) Filed: Sep. 8, 2005

(65) Prior Publication Data

US 2006/0053086 A1    Mar. 9, 2006

(30) Foreign Application Priority Data

Sep. 9, 2004    (GB)    .................... 0420068

(51) Int. Cl.
*H04N 1/409* (2006.01)
(52) U.S. Cl. .................... 358/3.26; 358/1.9; 382/156
(58) Field of Classification Search ................ 358/3.26, 358/1.9, 1.1; 382/156, 155, 268
See application file for complete search history.

(56) References Cited

U.S. PATENT DOCUMENTS

| | | | |
|---|---|---|---|
| 5,497,430 A * | 3/1996 | Sadovnik et al. ............ 382/156 |
| 6,119,083 A | 9/2000 | Hollier et al. |
| 6,281,942 B1 * | 8/2001 | Wang .......................... 348/607 |
| 6,539,060 B1 * | 3/2003 | Lee et al. ................ 375/240.29 |
| 2001/0017944 A1 | 8/2001 | Kalevo et al. |
| 2002/0164084 A1 | 11/2002 | Baggs |
| 2005/0089215 A1 * | 4/2005 | Staelin et al. ............... 382/157 |

FOREIGN PATENT DOCUMENTS

| EP | 0 998 146 A1 | 5/2000 |
|---|---|---|
| WO | WO 2004/014084 A1 | 2/2004 |

OTHER PUBLICATIONS

Search Report dated Jan. 19, 2005 in United Kingdom Application No. 0420068.9 (2 pages).
Written Opinion of the International Searching Authority (7 pages), issued in PCT/GB2005/003474.
International Search Report dated Nov. 24, 2005 (4 pages), issued in PCT/GB2005/003474.
Dong-Su Kim, Sung-Il Chien, Automatic Car License Plate Extraction Using Modified Generalized Symmetry Transform and Image Warping, ISIE Jun. 12, 2001, vol. 3, (pp. 2022-2027).
Y.-L.Huang and R.-F.Chang, Adaptive MLP post-processing for block-based coded images, IEE Proc.-Vis. Image Signal Process, vol. 147, No. 5, Oct. 2000 (pp. 463-473).

* cited by examiner

*Primary Examiner*—Thomas D Lee
(74) *Attorney, Agent, or Firm*—Flynn, Thiel, Boutell & Tanis, P.C.

(57) ABSTRACT

A method and apparatus are provided for removing regularly occurring visible artifacts in decompressed video images. Firstly a decompressed video signal is received. This is filtered frame-by-frame to extract data related to the artifacts. The thus extracted data is then processed in a neural network processor which has been trained to identify the artifacts in order to produce data identifying their locations. The video signal is then corrected to reduce the effect of the thus identified artifacts.

15 Claims, 4 Drawing Sheets

METHOD AND APPARATUS FOR REMOVING VISIBLE ARTEFACTS IN VIDEO IMAGES

This invention relates to a method and apparatus for removing visible artifacts in video images, such as the blocky artifacts introduced by compression and subsequent decompression using MPEG which operates on a block-by-block basis.

When compression and decompression schemes are used on video images, there is inevitably some loss of data. Most compression/decompression schemes such as MPEG operate on a block-by-block basis. As the image data of adjacent blocks is different, the elements of the data which may be lost during the compression/decompression process may differ from block to block. When the image is viewed after decompression, this can lead to visible blocky artifacts in the image. This mismatch in adjustment of data between adjacent blocks can apply to any characteristic of the video image such as RGB values or other methods of defining the video data.

If the position of the blocks in the image is known, then a smoothing filter can be applied across the block transition for each characteristic of the image to help to eliminate the blockiness which arises from the compression/decompression scheme. This will then reduce the degree to which the blocky artifacts are visible.

Problems arise when trying to remove artifacts from a signal where some unknown scaling or shifting of the array of blocks has taken place during the compression/decompression scheme. For example, satellite and digital television signals are typically decoded using some form of set top box. Many of these will apply a shifting or scaling to the array of blocks. The shifting or scaling will not be known to the receiver on which the image is to be viewed. Because of this shifting or scaling, no final assumption can be made about the previous processing of the video stream.

In addition to the blocky artifacts introduced by compression/decompression, other signals are present which may confuse any system designed to detect the blocky structures. These signals can be regarded as noise and are divided into three main groups.

a) Noise from highly detailed scenes.

b) Noise from blocks actually present in the real image such as backgrounds with bricks, metal grids etc.; and c) Regular noise generated in the signal by the application of filters.

The first noise group is of the random kind and is therefore potentially less of a problem. The second noise group is potentially a source of misleading blocky patterns in any analysis of the data. The third group may or may not be present because it is not known what previous video processing has been applied. The worst case scenario would be previous usage of low pass filters on a regular grid. This third kind of noise can be as significant as the blocks due to video compression.

Preferred embodiments of the invention provide a method and apparatus for detecting regular occurring artifacts such as a blocky structure in a video image by analyzing characteristics of the video signal over a sequence of frames and determining whether the data in these frames contains any regularly occurring structure such as a blocky structure. Once the structure has been detected, a correction may be made to the video image to reduce the effect of these blocky artifacts.

Preferably the blocky structure is detected using a neural network system.

Preferably the artifacts are detected over a number of frames of video data.

Preferably the artifacts are repeatedly detected.

A preferred embodiment of the invention will now be described in detail by way of example with reference to the accompanying drawings in which.

Figure 1:
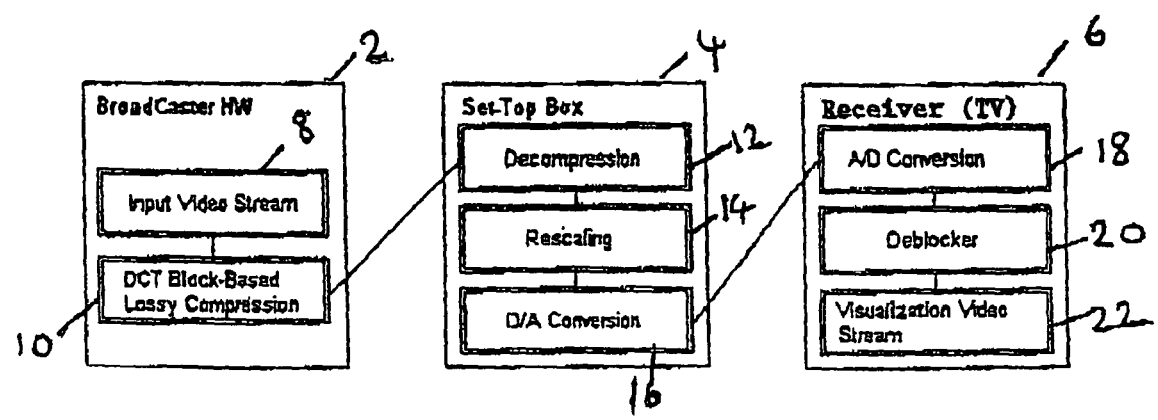
FIG. 1 shows a block diagram of a system for compressing and decompressing video data in which regularly occurring artifacts may arise.

In FIG. 1, there are three components, broadcaster hardware 2, a set top box or other decoder 4 as would be provided to a user, and a receiver such as a television (6) which is used to display the signal decoded by the set top box.

The broadcast hardware receives an input video stream 8 which is compressed using a DCT block based lossy compression system such as MPEG in a compressor 10. In the set top box 4, decompression of this compressed signal is performed by unit 12 and some rescaling may be performed by unit 14 before a digital to analog conversion is performed to send the signal to a television receiver 6. The digital to analog conversion is performed in a D/A converter 16.

In the receiver 6, in order to analyze more easily the image for any blocky structure, firstly an analog to digital conversion is performed by a deconverter 18. A deblocker 20 then detects a block-like structure in the image and applies appropriate correcting filtration to this in the visualization of the video stream at 22.

The A/D converter 18 of the receiver 6 could be eliminated if a set top box were provided with an output after the rescaling unit 14. There would then be two inputs to the television receiver, one being a digital input for use in determining the blocky structure in the system and the other being an analog signal to which correction for the blocky structure would be applied.

The deblocker 20 analyzes data along rows in the image and down columns to look for blocky artifacts. Before analysis, it is preferable to apply a 2D derivative filter over the entire frame. The object of this is to make more general the shape of data in the frame in an attempt to extract only the features significant for further processing. Looking at this derivative filter in one dimension it is of the form:

Derivative filter=absolute value(data)(i+1)−data(i)).

Where 'i' is the pixel position and 'data' is the data at that pixel position for a given characteristic of the video image.

Figure 2:
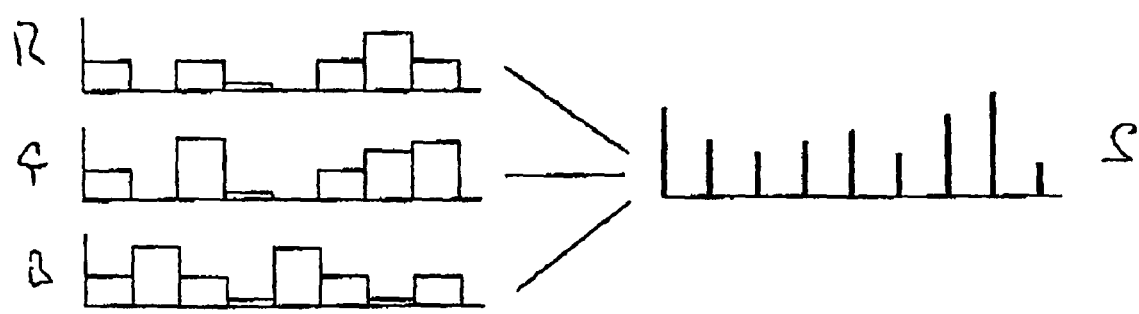
FIG. 2 shows graphically the effect of the artifacts on three video components and the data to be derived from the artifacts.

FIG. 2 shows in general form the effect of this filter working along a line of the image for three video components R, G and B. The horizontal axis of the three graphs on the left hand side represent distance along a line and the vertical axis represents the level of the component. Thus it can be seen that if there is a blocky structure on the image, there will be transitions in each of the R, G and B values at the block edges. Applying the derivative filter to these values and then summing the absolute values gives the output spikes S in the right hand graph. These spikes then represent the locations of block edges along the lines. Similar data will be available down the columns of the image.

Thus, the grid structure of the blocks is transformed by the derivative filters into a set of data with spikes. If the grid is 8×8, then this will become a set of data with spikes every 8 values both vertically and horizontally.

Once this data is available for the whole image, it can be processed to detect whether or not it represents a regular grid. As mentioned above, the presence of noise in the image may result in additional spikes being present. It is then necessary to use a system which is capable of determining which spikes relate to the blocky structure and which may relate to some other characteristic of the image. We have appreciated that using a neural network pattern recognition system is the best way to overcome the problems caused particularly by regularly reoccurring noise in the image.

For the set of spikes every 8 values the neural network will recognize this structure as belonging to a class of 8×8 grids. It will then output the grid step (the separation between the spikes) as a value of 8. Once the grid has been detected, the position of the highest spikes gives the horizontal and vertical shift of the grid.

Figure 3:
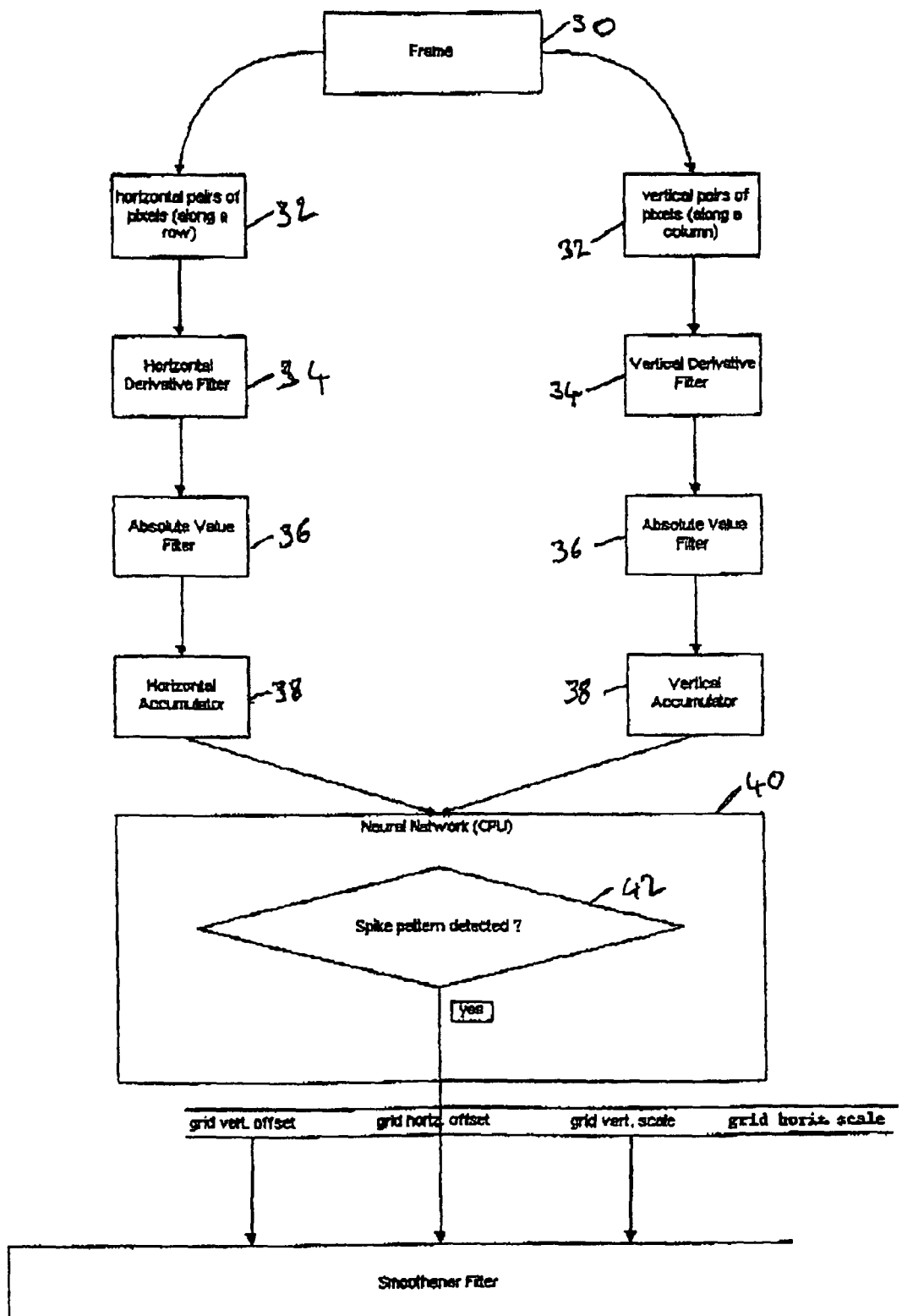
FIG. 3 shows a block diagram of a system for analyzing each frame of a video signal over a sequence of frames in accordance with an embodiment of the invention.

FIG. 3 shows schematically the way in which an embodiment of an invention works. In this, each frame of data passes to a frame store 30. Similar processes are then applied to the vertical columns and horizontal rows of pixels. Along each column or row, a pair of pixels is selected and stored at 32 before a derivative filter 34 is applied to this pair of pixels. This is a derivative filter of the form discussed above. An absolute value filter 36 is then applied to the output of each derivative filter and the outputs of these are applied to corresponding horizontal and vertical accumulators 38. The purpose of these is to store the outputs of the derivative filters for pixel locations within the frame. Once the whole frame has been analyzed in this manner and the horizontal and vertical accumulators store all the data for the frame, the data from them is supplied to a neural network CPU 40.

The neural network CPU starts to analyze the received data after the first frame has been processed. It looks for spike patterns along lines and down columns of the form shown in FIG. 2. Neural networks of course operate by learned behavior. Thus, it may not initially be able to pick out the blocky structure caused by decompression. If this is the case, it will not make any correction to the video signal being displayed. Over a number of frames, the spikes caused by decompression and scaling should become more apparent to the neural network CPU and will then enable it to provide a correction in the form of a smoothing filter to the video signal being displayed on the receiver.

When a spike pattern is detected at 42, the neural network CPU outputs data relating to vertical and horizontal offsets of the grid it has detected, and vertical and horizontal scaling of the grid it has detected to a smoothing filter 44. This filter is then applied to the video stream for display at the block intersections. The filter is a simple one that it smoothes across the video component values between adjacent pixels at the block transitions. More complex filters may be used but, in its most simple form, this will be a filter which operates on two pixels only. In more complicated systems, it could use more than one adjacent pixel.

In an MPEG system, the block sizes are typically 8×8 pixels.

It will be appreciated that when the receiver and deblocker are powered up, it may take a short interval of time before the neural network CPU starts to detect a blocky structure and therefore may take a short while before the smoothing filter is applied to the video signal being displayed. The grid will start to be detected once the system is stable.

In the presence of other grid-like structures in the image being displayed, the neural network CPU may detect these as being more significant than the blocky structure caused by decompression and rescaling in the set top box 4. In order to connect for such circumstances, a user input may be provided to the deblocker to ignore the blocky structure it has detected and to search for a further blocky structure.

The data from the frames of the video signal are repeatedly collected. The neural network circuitry includes data buffers. When these approach the storage limit, all the values are halved so this additional data can be read in. There is no waiting applied to recent or old data. All is given the same waiting.

The neural network is initially trained to recognize the particular blocky structure it is trying to identify. This is done by initially providing it with data patterns corresponding to those which might be provided with when trying to pick out the blocky structure. After a number of iterations in which patterns are shown to the neural network, it is able to recognize the patterns on its own even though they may not be exactly the same as the ones shown to train it. Preferably this training procedure commences each time the system is powered up and the training patterns are stored in a separate memory coupled to the deblocking circuitry. This training procedure for the neural network leaves two optimal values being found for the free parameters which the neural network sets to drive its processing and thus its output. These parameters converge towards there optimal values during the training process. Once trained, the neural network is able to pick out the blocky structure so that correction can be made.

If the neural network does not behave as expected or something changes in the patterns it is trying to detect, the training or tuning sequence has to be run again. If modified patterns are to be detected, then these need to be included in the training set. Thus, if the deblocker has to detect a blocky structure in a decompressed signal which uses a different block size, then, a training sequence for this has to be provided and run. A manual input can be provided to do this. It is not necessary to change the topology of the neural network itself in the circumstances.

Figure 4:
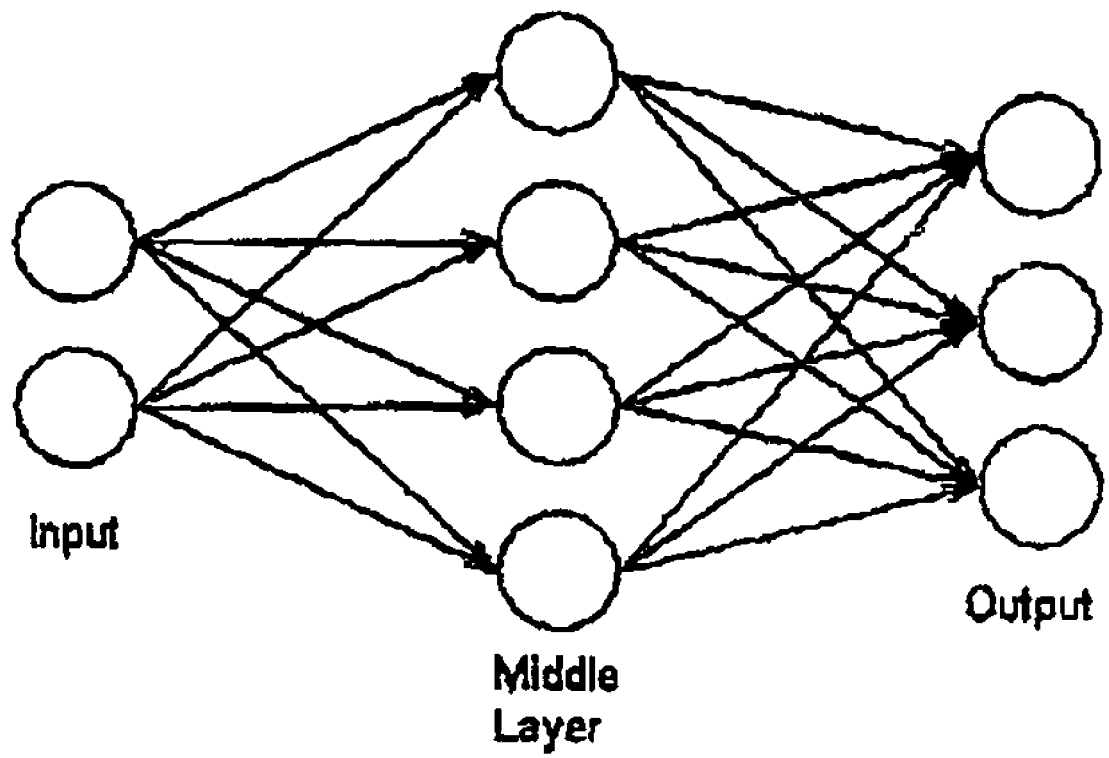
FIG. 4 shows schematically a neural network system of the type which might be used in an embodiment of the present invention.

In a preferred embodiment of the present invention, a two layer perceptron is used. This comprises 32 units in the input layer, 231 units in the middle layer, and 7 units in the output layer. These forms of neural networks are well known. The basic structure is shown in FIG. 4. Such neural networks are well known and have been widely studied. The exact operation of the neural network is not critical to the present invention.

Thus it will be seen that there are two main stages to the processor embodying this invention. Firstly, the neural network must be trained with a grid-like structure of the type it is intending to identify. Subsequently, it is supplied with grids on a frame-by-frame basis. It analyzes this data and from it attempts to pick out the appropriate pattern before providing offset and scaling data. These can then be used to correct the image data, preferably by applying a smoothing filter across block transitions.

The invention claimed is:

1. A method of removing structures of regularly occurring artifacts in decompressed video images, comprising the steps of:
   providing a neural processor;
   training the neural processor to specifically identify the structure of regularly occurring artifacts in a video signal;
   providing a decompressed video signal;
   filtering rows and columns of a video signal frame of the decompressed video signal frame-by-frame to extract data related to visible artifacts,
   processing the extracted data frame-by-frame in the neural processor to produce data identifying the locations of the structures of the artifacts in the video signal; and correcting the video signal to reduce the effect of identified structures of the artifacts.

2. The method according to claim 1, in which the artifacts are identified over a number of frames of the video signal.

3. The method according to claim 1, in which the artifacts are repeatedly identified.

4. The method according to claim 1, in which the correcting step comprises filtering an image to reduce the effect of the artifacts.

5. The method according to claim 4, in which the correcting step comprises applying a smoothing filter to the artifacts.

6. The method according to claim 1, wherein the filtering is performed with a derivative filter.

7. The method according to claim 6, wherein the neural processor detects spikes in the filtered data and determines which spikes relate to the visual artifacts.

8. The method according to claim 1, wherein the neural processor utilizes a two-layer perception.

9. An apparatus for removing regularly occurring visible artifacts in a decompressed video signal, comprising:
means for receiving the video signal;
means for filtering the video signal frame-by-frame to extract data related to the artifacts;
a neural network processor trained and configured to specifically identify the artifacts and produce data relating to the location of the artifacts in the video signal; and
means for correcting the video signal by reducing the effects of the identified artifacts.

10. The apparatus according to claim 9, wherein the neural network processor is configured to identify the artifacts over a number of frames.

11. The apparatus according to claim 10, wherein the correcting means comprises means for filtering the image to reduce the effect of the artifacts.

12. The apparatus according to claim 11, wherein the means for filtering comprises a smoothing filter.

13. The apparatus according to claim 9, wherein the neural network processor is configured to repeatedly identify the artifacts.

14. A method for identifying regularly occurring visible artifacts in decompressed video images, comprising the steps of:
receiving a decompressed video signal;
filtering the video signal frame-by-frame to extract data relating to the artifacts;
training a neural network processor to specifically identify the artifacts;
identifying locations of the artifacts using the neural network processor; and
correcting the video signal to reduce the effect of the identified artifacts.

15. An apparatus for identifying regularly occurring visible artifacts in a decompressed video signal, comprising:
means for receiving a video signal;
means for filtering the video signal frame-by-frame to extract data related to the artifacts;
a neural network processor trained and configured to specifically identify the artifacts and produce data relating to the location of the artifacts in the video signal; and
means for correcting the video signal to reduce the effect of the identified artifacts.

\* \* \* \* \*